(12) United States Patent
Nixon et al.

(10) Patent No.: US 8,067,093 B2
(45) Date of Patent: Nov. 29, 2011

(54) CURING AGENTS FOR EPOXY-FUNCTIONAL COMPOUNDS

(75) Inventors: Steve Alister Nixon, Whitley Bay (GB); Susan Elizabeth Borthwick, Wallsend (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 215 days.

(21) Appl. No.: 12/161,298

(22) PCT Filed: Jan. 15, 2007

(86) PCT No.: PCT/EP2007/050313
§ 371 (c)(1),
(2), (4) Date: Aug. 26, 2008

(87) PCT Pub. No.: WO2007/082853
PCT Pub. Date: Jul. 26, 2007

(65) Prior Publication Data
US 2010/0168277 A1    Jul. 1, 2010

Related U.S. Application Data

(60) Provisional application No. 60/765,180, filed on Feb. 6, 2006.

(30) Foreign Application Priority Data

Jan. 17, 2006    (EP) .................................. 06100450

(51) Int. Cl.
*B32B 27/38* (2006.01)
*C08L 63/00* (2006.01)
*C08G 73/00* (2006.01)
*C08G 73/10* (2006.01)

(52) U.S. Cl. ........ 428/413; 525/529; 525/530; 525/531; 525/533; 528/363; 528/366; 528/421; 528/422

(58) Field of Classification Search ................... 523/402; 525/523, 529, 530, 531, 533; 528/363, 366, 528/421, 422; 428/413
See application file for complete search history.

(56) References Cited

U.S. PATENT DOCUMENTS

| | | | | |
|---|---|---|---|---|
| 2,899,397 | A | * | 8/1959 | Aelony et al. .................. 523/414 |
| 2,970,971 | A | * | 2/1961 | Katz et al. ...................... 528/405 |
| 3,159,612 | A | * | 12/1964 | Tsou et al. ........................ 162/72 |
| 3,247,163 | A | | 4/1966 | Reinking |
| 3,449,278 | A | | 6/1969 | McKay ey al. |
| 3,900,437 | A | * | 8/1975 | Preston ....................... 528/111.3 |
| 5,017,675 | A | * | 5/1991 | Marten et al. .................. 528/111 |

FOREIGN PATENT DOCUMENTS

| | | | |
|---|---|---|---|
| DE | 1 072 805 | | 1/1960 |
| EP | 0 709 418 | | 5/1996 |
| JP | 54-148099 A | * | 11/1979 |
| JP | 58 063737 | | 4/1983 |
| JP | 2000281759 | | 10/2000 |
| WO | WO 02/074832 | | 9/2008 |

OTHER PUBLICATIONS

Translation of JP 54-148099 A, provided by the USPTO translations branch (no date).*
International Search Report, PCT International Application No. PCT/EP2007/050313, dated May 18, 2007.
Search Report, European Application No. EP 06 10 0450, dated Jun. 19, 2006.

* cited by examiner

*Primary Examiner* — Michael J Feely
(74) *Attorney, Agent, or Firm* — Kenyon & Kenyon LLP

(57) ABSTRACT

The present invention relates to compounds suitable to use as curing agents for epoxy systems which can be obtained by reacting an amine-functional compound with an α-β unsaturated acid and/or ester and a mono-functional epoxy compound. The invention further relates to coating compositions comprising these curing agents.

21 Claims, No Drawings

US 8,067,093 B2

CURING AGENTS FOR EPOXY-FUNCTIONAL COMPOUNDS

REFERENCE TO RELATED APPLICATION(s)

This application is the U.S. National Phase of PCT/EP2007/050313 filed on Jan. 15, 2007 and claims the benefit of U.S. Provisional Application No. 60/765,180 filed on Feb. 6, 2006.

The present invention relates to amine-functional curing agents for epoxy-functional compounds. In this context, amine-functional means comprising one or more —NH or —NH$_2$ groups. The present invention also relates to the application of such amine-epoxy systems in coating compositions and to substrates coated with such coating compositions.

Some of the amine-functional compounds that can be used to cure epoxy-functional compounds are associated with health and environmental issues. For example, they may be skin sensitisers. Additionally, amine-functional compounds may be sensitive to the prevailing environmental conditions, such as humidity and carbon dioxide, during the cure of systems containing epoxy-functional compounds.

An often encountered problem when curing coating compositions comprising epoxy-functional compounds and amine-functional compounds is the formation of so-called "amine-bloom". A possible explanation for the formation of amine-bloom is that during film formation the amine-functional curing agent can react with water and CO$_2$ to form carbamate salts. These carbamate salts are often incompatible with the bulk of the coating film and are exuded to the surface. Thus a greasy film ("amine bloom") is formed on the surface of the cured coating that has an adverse affect upon appearance and overcoating. Another consequence of the reaction of the amine-functional curing agent with water and CO$_2$ is that it prevents the amine from reacting with an epoxy. Hence, there are fewer amine groups to react with epoxy groups. This has an effect on the network that is formed in the film, and thus on the film properties. Amine bloom is most prevalent when curing is to take place at low temperatures in conjunction with high humidity.

Over the last 40 years several people have tried to make the amine-epoxy reaction less sensitive, more robust, to the environmental conditions under which the cure is to take place and to reduce the risk of handling these materials. Typically, this has been done by pre-reacting the amine-functional compound. The reaction product has a smaller amount of free amine molecules and thus is more robust to the environmental conditions during the cure. Additionally, the reaction product is typically a larger molecule than the unreacted amine-functional compound. When sufficiently large, the molecule will be safer to use. One reason for this is that a sufficiently large molecule cannot get into the human skin and will thus not act as a skin sensitiser. It is assumed that amine curing agents that satisfy the EU definition of a polymer are safer to use than those that do not.

It is known, for example, to react an amine-functional compound with an aliphatic glycidyl ether to obtain an amine-functional compound that can be used to cure an epoxy-functional compound. Nevertheless, there are disadvantages to this approach. If a polyamine is reacted with an aliphatic di-functional glycidyl ether, the obtained amine-functional compound can be difficult to store. Upon storing, this amine-functional compound is not very stable and may "seed out", i.e. solid particles may settle to the bottom of the storage tank. A possible explanation for this problem is that most aliphatic diglycidyl ethers contain relatively high levels of hydrolysable chloride. Upon storing, the hydrolysable chloride can undergo a reaction with the amine-functional compound and form ammonium salts. Another disadvantage of a reaction product of a polyamine with an aliphatic di-functional glycidyl ether is that when the product has a sufficiently high molecular weight to be safer to use, it also has a very high viscosity. Hence, a relatively large amount of solvent is required to obtain a curing agent solution with a viscosity suitable for application by conventional techniques. When this reaction product is used in a coating composition, it will introduce a relatively large amount of volatile organic compounds, which increases the VOC (volatile organic content) of the composition.

WO 02/074832 discloses adducts of polyalkylene glycol mono-glycidyl ether and amine-functional compounds. This document states that the obtained adducts have comparatively low viscosities. Despite the fact that low molecular weight species can be obtained by the reaction of a mono-epoxy-functional compound with a polyamine, systems containing such reaction products have disadvantages. Firstly, because of the size of the molecules and the fact that they will not be polymeric, the materials are more likely to be biologically active and may thus cause health and environmental problems. If only a small amount of epoxy is reacted with the polyamine, a relatively high free amine content is maintained. The free amine content referred to in this specification is the amount of unreacted amine-functional compound(s) in the system. When a relatively high free amine content is maintained, the system is sensitive to reaction with water and carbon dioxide, and carbamate salts may be formed, appearing as the so-called "amine bloom" effect on the surface, as explained above. If a sufficient amount of epoxy is reacted with the polyamine to avoid amine bloom, low molecular weight adducts are obtained that have only a relatively low functionality. After cure of a system comprising such an adduct, the obtained network may not be satisfactory. The cross-link density may be too low to obtain a cured layer with acceptable hardness, toughness, flexibility, chemical resistance or any other coating property that is dependent upon adequate network development.

Another example of a known way to obtain amine curing agents of which part of the amine-functional groups has been pre-reacted, is to react an amine-functional compound with an acrylic acid or an ester of an acrylic acid. In U.S. Pat. No. 3,247,163 amine-acrylate adducts are described, as well as the use of these adducts to cure polyepoxides. JP 2000281759 discloses curing agents obtained by addition polycondensation of a (meth)acrylic alkyl ester with an alicyclic diamine. DE 1 072 805 describes curing agents for epoxy systems prepared by reacting aliphatic polyamines with acrylic acids or with acrylic esters.

In practice it has proven difficult to prepare good quality curing agents with a low molecular weight when reacting a polyamine with an acrylic acid. When a relatively small amount of an acrylic acid is reacted with a polyamine, a low molecular weight compound can be obtained. Whilst these materials will often have a low viscosity they will also have a high free amine content, making them susceptible to amine bloom formation when cured at low temperatures and high relative humidities. Additionally, the low molecular weight and high free amine content of these materials may make them hazardous to handle. When the amount of acrylic acid used in the reaction is high enough to obtain a curing agent with a low free amine content that is resistant to amine bloom formation, the curing agents will have a high viscosity. Hence, it is a problem to choose the molar equivalence ratio of the polyamine and the acrylic acid such that curing agents are obtained that are resistant to amine bloom formation and also have a sufficiently low molecular weight to ensure that no or only a small amount of organic solvent is required to obtain a curing agent with a sufficiently low viscosity.

EP 0 709 418 A discloses self-emulsifiable amine curing agents for use in water-borne coatings. The curing agent can be the reaction product of an amine, an epoxy functional polyether and a hydrophobic epoxy and optionally an acrylic ester or acid. In this system, the amine reacts with the double bond of the acrylic compound, and not with the acid functionality which would require process conditions with higher temperatures. The presence of polyether chains in the resultant paint film has an adverse affect upon film and immersion properties.

Curing agents that cure adequately when the ambient conditions are a low temperature coupled with a high relative humidity do exist. Typically, these are polymeric Mannich bases prepared by the reaction of monomeric phenols, formaldehyde, and polyamines such as ethylene diamine. Whilst these materials can be very effective low temperature curing agents, they discolour very rapidly upon exposure to sunlight.

The present invention provides a solution to the drawbacks associated with the above-mentioned prior art. Especially the combination of resistance to amine bloom formation and the possibility to use a high solids curing agent is aimed for. Another aim of the present invention is to provide curing agents for epoxy systems that have good colour stability; that is, after curing the cured epoxy system should have a good colour stability. By colour stability, it is meant that the system will change colour at a slower rate than epoxy films cured with conventional high solids low temperature curing agents when exposed to sunlight. Another aim is to provide curing agents that cure epoxy systems at a relatively high curing rate. A further aim is to provide low viscosity high solids amine-functional curing agents which can be used to cure epoxy systems at a low temperature and with which a cured system with good colour stability can be obtained.

The object of the present invention is achieved by using a curing agent which can be prepared by reacting a mono-functional epoxy compound with an amide obtainable by reacting one or more amine-functional compounds having 2 or more —NH or —NH$_2$ groups with one or more α-β unsaturated acids and/or one or more α-β unsaturated esters, or by any other preparation method resulting in the same end product. Typically, amides are formed by reacting the amine functional compounds and the acids and/or esters at a temperature above 160° C., e.g. 180° C. or higher. The curing agent may have one or more amide groups.

Optionally other compounds may be added to the reaction. An amine-functional compound having 2 or more —NH or —NH$_2$ groups will also be referred to as a "polyamine". A compound containing one epoxy group will also be referred to as a "mono-functional epoxy compound".

The compounds of the present invention show the advantages that were aimed for. They can be used as curing agents for epoxy-functional compounds and for systems comprising epoxy-functional compounds. It was found that the curing agents according to the present invention are resistant to amine bloom formation when cured under conditions of low temperature and high humidity. When curing agents according to the present invention are used to cure systems comprising epoxy-functional compounds, systems can be prepared that show no detectable amine bloom when cured at temperatures of 10° C. or lower and at relative humidities in excess of 60%. The curing agents have a sufficiently low molecular weight to ensure that no or only a small amount of organic solvent is required to obtain a curing agent with a sufficiently low viscosity. Another advantage of the compounds according to the present invention is that high solids coating compositions comprising one or more curing agents according to the present invention and one or more epoxy-functional compounds can be prepared, which also show no amine bloom when cured at temperatures of 10° C. or lower and at relative humidities in excess of 60%.

When curing agents according to the present invention are used to cure systems comprising epoxy-functional components, the cured epoxy system generally shows good colour stability upon exposure to sunlight. For example, epoxy systems can be prepared that, after curing, show significantly reduced yellowing upon exposure to sunlight compared to the current high solids, low temperature curing agents, such as the polymeric Mannich bases described above. Further, curing agents according to the present invention show a relatively high curing rate when used to cure epoxy systems. The curing agents can be used to cure epoxy systems at ambient temperatures, for example temperatures in the range from 5 to 30° C., but also at elevated temperatures. A major advantage of the compounds of the present invention is that they can be used to prepare a high solids epoxy system that cures at a low temperature and shows good colour stability.

Amine-functional compounds suitable for the preparation of the curing agents according to the invention are for example: ethylene diamine, 1,3 propane diamine, 2,2-dimethyl-1,3-propane diamine, 1,4-butane diamine, 1,6-hexamethylene diamine, 2,2,4-trimethyl hexamethylene diamine, 1,3-pentane diamine, 2-methyl-1,5-pentane diamine, diethylene triamine, triethylene tetramine, tetraethylene pentamine, pentaethylene hexamine, piperazine, aminoethyl piperazine, m-xylylene diamine, 1,3-bis-(aminomethyl)cyclohexylamine, isophorone diamine, 4,4'-methylene bis cyclohexylamine Preferred di-amines are 2,2-dimethyl1,3-propane diamine, 2,2,4-trimethyl hexamethylene diamine, 2-methyl-1,5-pentane diamine, m-xylylene diamine, and 1,3-bis-(aminomethyl)cyclohexylamine. Very suitable polyamines are aliphatic amines, such as trimethyl hexamethylene diamine and 2-methyl-1,5-pentane diamine. Highly suitable polyamines are ring-containing diamines, for example m-xylylene diamine and 1,3-bis amino methyl cyclohexane.

As examples of suitable α-β unsaturated acids and esters, the following compounds can be mentioned: acrylic acid, methacrylic acid, methyl methacrylate or similar methacrylate esters, methyl acrylate or similar acrylate esters, maleic acid or anhydride, maleic esters, fumaric acid and fumaric esters, and crotonic acid and crotonic acid esters.

As examples of suitable mono-functional epoxy compounds, the following compounds can be mentioned: mono-functional glycidyl ethers, such as butyl glycidyl ether, hexyl glycidyl ether, cyclohexyl glycidyl ether, 2-ethylhexyl glycidyl ether, $C_{12}$-$C_{14}$ alkyl glycidyl ether (epoxide 8), gresyl glycidyl ether, and phenyl glycidyl ether.

When the amine functional compounds and the unsaturated acid or ester compounds are reacted at an elevated temperature, the amine groups do not only react with the double bonds but also with the acid groups to form amide groups. Whereas the reaction of an amine with an activated double bond is very rapid already at ambient temperatures, the reaction of an amine with a carboxylic acid or ester group is much slower and typically requires processing at temperatures in excess of 160° C., e.g., 180° C. or higher, or other measures with the same effect. This way, the unsaturated acids or esters are used as di-functional compounds, rather than as mono-functional compounds as is the case in, e.g., EP 0 709 418.

The mono-functional epoxy can for example be added simultaneously or it can be added before or after reacting the polyamine with the unsaturated acid and/or ester, for instance after the reacted mixture of amines and unsaturated acid and/or esters has cooled down to a temperature below 100° C., e.g. 75-85° C., e.g. about 80° C.

The amine-functional compounds according to the present invention, which are suitable to cure epoxy-functional compounds, can be prepared by reacting 50 to 80 wt % polyamine(s) with 7.5 to 17.5 wt % α-β unsaturated acid(s) and/or ester(s) and 10 to 50 wt % mono-functional epoxy compound(s), where wt % is 100 multiplied by the weight of a given component divided by the total weight of material in the initial charge. Preferably, the ratios of the reactants are 60 to 75 wt % polyamine(s) to 10 to 16 wt % α-β unsaturated acid(s) and/or ester(s) and 20 to 40 wt % mono-functional epoxy compound(s), where wt % is 100 multiplied by the weight of a given component divided by the total weight of material in the initial charge. Most preferably, the ratios of the reactants are 65 to 70 wt % polyamine(s) to 12 to 15 wt % α-β unsaturated acid(s) and/or ester(s) and 25 to 35 wt % mono-functional epoxy compound(s), where wt % is 100 multiplied by the weight of a given component divided by the total weight of material in the initial charge.

The amine-functional compounds according to the present invention can be prepared by reacting 40-90 mol % polyamine(s) with 5-50 mol % α-β unsaturated acid(s) and/or ester(s) and 5-55 mol % mono-functional epoxy compound(s), where mol % is 100 multiplied by the number of moles of a given component divided by the total number of moles in the initial charge. Preferably, the ratios of the reactants are 45-75 mol % polyamine(s) to 10-40 mol % α-β unsaturated acid(s) and/or ester(s) and 10-40 mol % mono-functional epoxy compound(s), where mol % is 100 multiplied by the number of moles of a given component divided by the total number of moles in the initial charge. Most preferably, the ratios of the reactants are 50-65 mol % polyamine(s) to 15-30 mol % α-β unsaturated acid(s) and/or ester(s) and 15-25 mol % mono-functional epoxy compound(s), where mol % is 100 multiplied by the number of moles of a given component divided by the total number of moles in the initial charge.

The number average molecular weight (Mn) of the amine-functional compounds according to the present invention which are suitable to cure epoxy-functional compounds can be 200-1000, and preferably is 300-500. Number average molecular weight numbers can, for example, be calculated from a simplified Stockmeyer distribution function, said calculation resulting in theoretical figures for the number average molecular weight.

The nitrogen equivalent weight of the amine-functional compounds according to the present invention which are suitable to cure epoxy-functional compounds normally is in the range of 50 to 250 g/mol, preferably 75-225 g/mol, and even more preferably 100-200 g/mol. The nitrogen equivalent weight can be determined by titration. The nitrogen equivalent weight ranges indicated above concern the titratable nitrogen atoms.

When one or more amine-functional compounds according to the present invention are used to prepare a formulated curing agent system that can be used as curing agent for an epoxy system, the curing agent system normally comprises:
one or more amine-functional compounds according to the present invention,
organic solvent and/or water, and
optionally a catalyst.

The viscosity of an unformulated amine-functional compound according to the present invention preferably is 10-100 Poise at room temperature. Polyamines with a viscosity in the range of 10-100 poise can be readily formulated to give curing agents with a viscosity <10 poise at room temperature that can be used to formulate coatings with a volume solids content of >75%. The figures of these viscosities are determined as high shear viscosities measured with a cone and plate viscometer. High shear viscosities can, for example, be measured using a high shear viscometer in accordance with ASTM D 4287 00 with a shear rate of 10,000-12,000 $s^{-1}$.

Optionally, a curing agent system according to the present invention comprises a catalyst. As examples of suitable catalysts can be mentioned nonyl phenol, salicylic acid, tris (dimethyl)-aminomethyl phenol, diazabycyclo octane, diazabicyclo undecene, water, ammonium thiocyanate, lithium tetrafluoroborate, potassium thiocyanate, sodium tetrafluoroborate, lithium benzoate, lithium lactate, lithium hydroxide, lithium acetylacetanoate, calcium nitrate, lithium perchlorate, lithium formate, lithium thiocyanate, potassium tetrafluorborate. Preferred catalysts are sodium tetrafluoroborate, potassium thiocyanate, lithium lactate, lithium hydroxide, lithium benzoate, and water.

Coating compositions can be prepared which comprise an amine-functional curing agent or curing agent system according to the present invention and one or more epoxy-functional compounds.

The coating compositions according to the present invention can be water borne or solvent borne and may comprise water and organic solvent. Preferably, the coating compositions comprise one or more organic solvents; more preferably, the coating compositions are high solids compositions comprising no or only up to 20 wt % organic solvent, based on the total coating composition. The coating composition of the present invention preferably comprises a volatile organic content (VOC) of less than 430 grams per liter of organic solvent. More preferably, the coating composition comprises a VOC of less than 340 grams per liter, even more preferably a VOC of less than 250 grams per liter. The solids content of a composition according to the present invention preferably is higher than 60% by weight, more preferably higher than 70% by weight, even more preferably 80% by weight, based on the total coating composition.

Coating compositions according to the present invention may comprise a catalyst. The catalyst can be part of the curing agent system of the coating composition. Additionally or alternatively, the catalyst can be formulated as part of the paint base.

The coating compositions of the invention may contain one or more further ingredients. They may contain one or more pigments, for example titanium dioxide (white pigment), coloured pigments such as yellow or red iron oxide or a phthalocyanine pigment and/or one or more strengthening pigments such as micaceous iron oxide or crystalline silica and/or one or more anticorrosive pigments such as metallic zinc, zinc phosphate, wollastonite or a chromate, molybdate or phosphonate and/or a filler pigment such as barytes, talc or calcium carbonate. The composition may contain a thickening agent such as fine-particle silica, bentonite clay, hydrogenated castor oil, or a polyamide wax. The composition may also contain a plasticiser, pigment dispersant, stabiliser, flow aid, or thinning solvent.

The coating compositions of the invention generally cure at ambient temperatures, for example temperatures in the range from 0 to 30° C. or even to 50° C., and thus are suitable for application to large structures where heat curing is impractical. The coating compositions of the invention alternatively can be cured at elevated temperatures, for example temperatures in the range from 30° C. or from 50° C. to 80° C. up to 100 or 130° C., to speed up the curing.

The coating compositions of the invention in general can be used as finish coatings and/or primer coatings. The coating composition can be applied directly to prepared carbon steel as a primer/finish, i.e. the composition can be used as the only type of protective coating on a substrate.

The coating composition of the invention is preferably used as a protective primer coating, particularly on steel surfaces, for example bridges, pipelines, industrial plants or buildings, oil and gas installations, or ships. For this use it is generally pigmented with anticorrosive pigments. It may for example be pigmented with zinc dust; coatings according to the invention have a similar anticorrosive performance to known zinc silicate coatings but are less liable to mud cracking and can be readily overcoated, particularly with a polyurethane or polysiloxane finish, for example a finish coat according to the present invention. Primer coating compositions according to the invention can be used as maintenance and repair coatings on less than perfect surfaces such as aged blasted steel or "ginger" (steel which has been blasted and has started to rust in small spots), hand-prepared weathered steel, and aged coatings.

Preferably, the components of a coating composition according to the present invention are packed together as a so-called two-pack composition. One pack comprises one or more curing agents according to the present invention, and the other pack comprises one or more epoxy-functional compounds.

The invention will be elucidated with reference to the following examples. These are intended to illustrate the invention but are not to be construed as limiting in any manner the scope thereof. In the examples, pbw has the meaning of parts by weight.

EXAMPLES

Example 1

Preparation of an Amine-Functional Compound According to the Invention

An amine-functional compound was prepared by reacting a diamine with acrylic acid and a mono-functional glycidyl ether.

m-Xylylene diamine (MXDA) (656.9 g, 4.83 mol) was charged to a 700 ml reaction flask fitted with a stirrer, condenser, Dean & Stark separator, thermocouple, and $N_2$ sparge. Acrylic acid (AA) (72.0 g, 1.00 mol) was added to the flask at such a rate as to maintain the temperature below 30° C. Once all the acrylic acid was charged, the reaction temperature was raised to 180° C. to drive off the water of condensation. The reaction temperature was maintained at 180° C. until the acid value of the intermediate was less than 5. The reaction mixture was cooled to 80° C. and butyl glycidyl ether (BGE) (434.2 g, 3.34 mol) was added over two hours while the reaction temperature was maintained at 80° C. Once all the butyl glycidyl ether had been charged, the reaction temperature was maintained at 80° C. for a further two hours before the reaction product was cooled to 40° C. and discharged. The product was a clear mobile liquid of low viscosity (8.2 poise at 25° C.).

Comparative Example 1

Preparation of a Comparative Amine-Functional Compound

An amine-functional compound was prepared by reacting a diamine with a di-functional glycidyl ether and a mono-functional glycidyl ether.

m-Xylylene diamine (656.9 g, 4.83 mol) was charged to a 700 ml reaction flask fitted with a stirrer, condenser, thermocouple, and $N_2$ sparge, and the temperature was raised to 80° C. Hexanediol diglycidyl ether (230.0 g, 1.00 mol) was added to the flask at such a rate as to maintain the temperature at 80° C. Once all the hexanediol diglycidyl ether had been charged, the reaction temperature was maintained at 80° C. for a further two hours. Butyl glycidyl ether (434.2 g, 3.34 mol) was added over two hours while the reaction temperature was maintained at 80° C. Once all the butyl glycidyl ether had been charged, the reaction temperature was maintained at 80° C. for a further two hours before the reaction product was cooled to 40° C. and discharged.

Physical properties of the amine-functional compounds prepared in Example 1 and in Comparative Example 1

The physical properties of the amine-functional compounds prepared in Example 1 and in Comparative Example 1 are tabulated below.

| | Amine Value [mg · KOH · g⁻¹] | Theoretical Amine Value [mg · KOH · g⁻¹] | Viscosity [poise at 25° C.] | NVC[1] [wt %] | Acid Value [mg · KOH · g⁻¹] |
|---|---|---|---|---|---|
| Example 1 | 420 | 424 | 8.2 | 85.3 | 3.5 |
| Comparative Example 1 | 373 | 387 | 55.2 | 88.6 | 3.2 |

[1]NVC is non-volatile content

From the determined physical properties it is clear that the amine-functional compound prepared according to the present invention has a lower viscosity than the comparative amine-functional compound despite both materials having equivalent degrees of polymerisation and similar molecular weights.

Examples 2 to 6

Preparation of Amine-Functional Compounds According to the Invention Using several types of amine-functional compounds having 2 or more —NH or —NH₂ Groups Amine-functional compounds according to the invention were prepared by reacting the amine-functional compounds listed in the table below with acrylic acid and a mono-functional glycidyl ether. The physical properties of the amine-functional compounds prepared are tabulated below in the same table.

| | Amine | Formulation | | | Physical properties | | |
|---|---|---|---|---|---|---|---|
| | | Amine [wt (g)] | Acrylic Acid [wt (g)] | BGE[1] [wt (g)] | Amine Value [mg KOH · g$^{-1}$] | Viscosity[7] [Poise at 25° C.] | NVC[8] [Wt %] |
| Example 2 | MXDA[2] | 272 | 72.0 | 130.0 | 366.7 | 68.2 (at 35° C.) | 93.3 |
| Example 3 | Dytek EP[3] | 204 | 72.0 | 130.0 | 472.3 | 21.4 | 77.9 |
| Example 4 | TMD[4] | 316 | 72.0 | 130.0 | 337.2 | 81.4 | 89.7 |
| Example 5 | 1,3 BAC[5] | 284 | 72.0 | 130.0 | 362.3 | 76.6 (at 45° C.) | 92.1 |
| Example 6 | Dytek A[6] | 232 | 72.0 | 130.0 | 401.9 | 38.5 | 89.0 |

[1]BGE stands for butyl glycidyl ether
[2]MXDA stands for m-xylylene diamine
[3]Dytek EP is commercially available 1,3-pentane diamine
[4]TMD stands for 2,2,4 trimethylhexane diamine
[5]1,3 BAC stands for 1,3-(bis aminomethyl) cyclohexane
[6]Dytek A is commercially available 2-methyl-1,5-pentane diamine
[7]All viscosities were measured at 25° C., unless otherwise indicated
[8]NVC is non-volatile content To demonstrate the utility of the amine-functional compounds according to the invention as curing agents, each of the compounds was mixed with a liquid epoxy resin (DER331 ex Dow Chemicals) in a weight ratio such that there was 1 active H per amine curing agent to 1 epoxy group per epoxy resin. The cure speed was assessed using a "BK Dry Track Recorder" in accordance with ASTM 5895.

| | BK dry tack results at 25° C. | | BK dry track results at 5° C. | |
|---|---|---|---|---|
| Compound | End Gel tear [hours] | End of track [hours] | End Gel tear [hours] | End of track [hours] |
| Example 2 | 3.25 | 4.5 | 8.25 | >24 |
| Example 5 | 3 | 3.5 | 7.5 | 10.5 |
| Example 6 | 4.25 | 7.25 | 15.5 | >24 |
| Comparative Example 1 | 4 | 5 | 11 | >24 |

The results illustrate that the amine-functional compounds according to the invention can cure the epoxy resin faster than the comparative compound.

Examples 7-25

Preparation of an Amine-Functional Compound According to the Invention Using Different Ratios of Reaction Components The following examples illustrate that the ratios of the amine-functional compound(s) to the α-β unsaturated acid(s) and/or ester(s) to the mono-functional epoxy compound can be readily altered to formulate curing agents with tailored properties. Further, it is also demonstrated that it is possible to alter the mono-functional epoxy compound and to achieve further improvements in specific properties such as viscosity.

| | 1,3 BAC[1] [Wt (g)] | AA[2] [Wt(g)] | BGE[3] [Wt(g)] | Epoxide 8[4] [Wt(g)] | Amine Value [mgKOH · g$^{-1}$] | NVC [Wt %] | Visc [Poise at 55° C.] |
|---|---|---|---|---|---|---|---|
| Example 7 | 56 | 10 | 34 | | 378.8 | 87.48 | 4.78 |
| Example 8 | 55 | 11 | 34 | | 361.9 | 90.23 | 10.08 |
| Example 9 | 60 | 15 | 25 | | 377.3 | 89.36 | 25.89 |
| Example 10 | 70 | 15 | 15 | | 458.9 | 78.87 | 5.69 |
| Example 11 | 50 | 15 | 35 | | 296.0 | 96.25 | 78.5 |
| Example 12 | 60 | 13 | 28 | | 388.8 | 87.08 | 11.67 |
| Example 13 | 50 | 10 | 40 | | 327.1 | 91.75 | 11.77 |
| Example 14 | 65 | 14 | 21 | | 422.4 | 84.21 | 10.56 |
| Example 15 | 70 | 15 | 15 | | 455.9 | 78.17 | 5.73 |
| Example 16 | 62 | 12 | 27 | | 405.3 | 82.93 | 5.38 |
| Example 17 | 50 | 35 | 15 | | 293.5 | 72.93 | 76.7 |
| Example 18 | 67 | 13 | 20 | | 450.2 | 77.81 | 3.98 |
| Example 19 | 70 | 14 | 16 | | 465.1 | 76.20 | 4.21 |
| Example 20 | 50 | 10 | 40 | | 330.3 | 91.32 | 10.87 |
| Example 21 | 50 | 15 | | 35 | 285.8 | 92.51 | 52.1 |
| Example 22 | 50 | 10 | | 40 | 348.2 | 80.53 | 2.36 |
| Example 23 | 70 | 15 | 15 | | 442.3 | 77.36 | 5.89 |

-continued

|  | 1,3 BAC[1] [Wt (g)] | AA[2] [Wt(g)] | BGE[3] [Wt(g)] | Epoxide 8[4] [Wt(g)] | Amine Value [mgKOH·g$^{-1}$] | NVC [Wt %] | Visc [Poise at 55° C.] |
|---|---|---|---|---|---|---|---|
| Example 24 | 60 | 13 |  | 27 | 387.0 | 81.22 | 5.58 |
| Example 25 | 55 | 11 |  | 34 | 354.5 | 83.70 | 5.23 |

[1]1,3 BAC stands for 1,3-(bis aminomethyl) cyclohexane
[2]AA stands for acrylic acid
[3]BGE stands for butyl glycidyl ether
[4]Epoxide 8 is $C_{12}$-$C_{14}$ alkyl glycidyl ether

The invention claimed is:

1. An amine-functional compound that is suitable to use as a curing agent for epoxy-functional compounds, obtained by:
reacting 40-90 mol % of a first reactant with 5-50 mol % of a second reactant to form an amide; and
reacting the amide with 5-55 mol % of a third reactant;
wherein the first reactant is at least one polyamine having 2 or more —NH or —NH$_2$ groups selected from the group consisting of ethylene diamine; 1,3 propane diamine; 2,2-dimethyl-1,3-propane diamine; 1,4-butane diamine; 2,2,4-trimethyl hexamethylene diamine; 1,3-pentane diamine; 2-methyl-1,5-pentane diamine; diethylene triamine; triethylene tetramine; tetraethylene pentamine; pentaethylene hexamine; piperazine; aminoethyl piperazine; m-xylylene diamine; 1,3-bis-(aminomethyl) cyclohexylamine; isophorone diamine; and 4,4'-methylene bis cyclohexylamine;
wherein the second reactant is at least one α-β unsaturated acid, at least one α-β unsaturated ester or a combination thereof;
wherein the third reactant is at least one mono-functional epoxy compound containing one epoxy group per molecule; and
wherein the mol % values are based on the combined molar amounts of each reactant.

2. The compound according to claim 1, wherein the at least one polyamine is selected from the group consisting of 2,2-dimethyl 1,3-propane diamine; 2,2,4-trimethyl hexamethylene diamine; 2-methyl-1,5-pentane diamine; m-xylylene diamine; and 1,3-bis-(aminomethyl)cyclohexylamine.

3. The compound according to claim 1, wherein the at least one polyamine is selected from the group consisting of trimethyl hexamethylene diamine and 2-methyl -1,5-pentane diamine.

4. The compound according to claim 1, wherein the at least one polyamine is selected from the group consisting of m-xylylene diamine and 1,3-bis amino methyl cyclohexane.

5. The compound according to claim 4, wherein the at least one α-β unsaturated acid, the at least one α-β unsaturated ester or the combination thereof is selected from the group consisting of acrylic acid, methacrylic acid, methacrylate esters, acrylate esters, maleic acid, maleic anhydride, maleic esters, fumaric acid, fumaric esters, crotonic acid, and crotonic acid esters.

6. The compound according to claim 5, wherein the at least one mono-functional epoxy compound is selected from the group consisting of butyl glycidyl ether, hexyl glycidyl ether, cyclohexyl glycidyl ether, 2-ethylhexyl glycidyl ether, $C_{12}$-$C_{14}$ alkyl glycidyl ether, gresyl glycidyl ether, and phenyl glycidyl ether.

7. The compound according to claim 1, wherein the at least one α-β unsaturated acid, the at least one αβ unsaturated ester or the combination thereof is selected from the group consisting of acrylic acid, methacrylic acid, methacrylate esters, acrylate esters, maleic acid, maleic anhydride, maleic esters, fumaric acid, fumaric esters, crotonic acid, and crotonic acid esters.

8. The compound according to claim 1, wherein the at least one mono-functional epoxy compound is selected from the group consisting of butyl glycidyl ether, hexyl glycidyl ether, cyclohexyl glycidyl ether, 2-ethylhexyl glycidyl ether, $C_{12}$-$C_{14}$ alkyl glycidyl ether, gresyl glycidyl ether, and phenyl glycidyl ether.

9. The compound according to claim 1 having a number average molecular weight (Mn) of 200-1000.

10. The compound according to claim 1 having a nitrogen equivalent weight of from 50 to 250 g/mol.

11. A curing agent system comprising:
the compound according to claim 1, and
at least one of an organic solvent and water.

12. The curing agent system according to claim 11, further comprising a catalyst.

13. The curing agent system according to claim 12, wherein the catalyst is selected from the group consisting of nonyl phenol, salicylic acid, tris (dimethyl)-aminomethyl phenol, diazabicyclo octane, diazabicyclo undecene, water, ammonium thiocyanate, lithium tetrafluoroborate, potassium thiocyanate,
sodium tetrafluoroborate, lithium benzoate, lithium lactate, lithium hydroxide, lithium acetylacetanoate, calcium nitrate, lithium perchlorate, lithium formate, lithium thiocyanate, and potassium tetrafluoroborate.

14. The curing agent system according to claim 12, wherein the catalyst is selected from the group consisting of sodium tetrafluoroborate, potassium thiocyanate, lithium lactate, lithium hydroxide, lithium benzoate, and water.

15. A curing agent system comprising:
the compound according to claim 6, and
at least one of an organic solvent and water.

16. A method of curing comprising adding the compound according to claim 1 to a system comprising one or more epoxy-functional compounds.

17. A method of curing comprising adding the compound according to claim 6 to a system comprising one or more epoxy-functional compounds.

18. A coating composition comprising the compound according to claim 1 and one or more epoxy-functional compounds.

19. A substrate coated with the coating composition according to claim 18.

20. A coating composition comprising the compound according to claim 6 and one or more epoxy-functional compounds.

21. A substrate coated with the coating composition according to claim 20.

* * * * *